United States Patent
Makled et al.

(10) Patent No.: US 10,023,177 B2
(45) Date of Patent: Jul. 17, 2018

(54) SYSTEM AND METHOD FOR ENGINE STARTING IN A HYBRID VEHICLE BASED ON ENGINE STOP POSITION

(71) Applicant: Ford Global Technologies, LLC, Dearborn, MI (US)

(72) Inventors: Daniel A. Makled, Dearborn, MI (US); Xiaoyong Wang, Novi, MI (US); Jeffrey Allen Doering, Canton, MI (US); Scott James Thompson, Canton, MI (US); Ameya Vivek Gadre, Canton, MI (US); Alexander O'Connor Gibson, Ann Arbor, MI (US); Seunghoon Lee, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 15/065,236

(22) Filed: Mar. 9, 2016

(65) Prior Publication Data
US 2017/0259808 A1   Sep. 14, 2017

(51) Int. Cl.
| | |
|---|---|
| B60W 20/20 | (2016.01) |
| B60K 6/46 | (2007.10) |
| B60K 6/547 | (2007.10) |
| B60W 10/02 | (2006.01) |
| B60W 10/06 | (2006.01) |
| B60W 10/08 | (2006.01) |

(52) U.S. Cl.
CPC ............... *B60W 20/20* (2013.01); *B60K 6/46* (2013.01); *B60K 6/547* (2013.01); *B60W 10/02* (2013.01); *B60W 10/06* (2013.01); *B60W 10/08* (2013.01); *B60W 2710/086* (2013.01); *B60Y 2200/92* (2013.01); *B60Y 2300/19* (2013.01); *Y10S 903/919* (2013.01)

(58) Field of Classification Search
CPC ...... B60W 20/20; B60W 10/02; B60W 10/06; B60W 10/08; B60W 2710/086; B60K 6/46; B60K 6/547; B60Y 2200/92; B60Y 2300/19; Y10S 903/919
See application file for complete search history.

(56) References Cited

U.S. PATENT DOCUMENTS

| | | |
|---|---|---|
| 7,367,416 B2 | 5/2008 | Seufert et al. |
| 8,447,451 B2 | 5/2013 | Kim et al. |
| 8,738,205 B2 | 5/2014 | Steuernagel et al. |
| 8,758,192 B2 | 6/2014 | Smith et al. |

(Continued)

*Primary Examiner* — Richard M Camby
(74) *Attorney, Agent, or Firm* — David B. Kelley; Brooks Kushman P.C.

(57) ABSTRACT

A system and method for controlling engine starting in a hybrid vehicle having an engine, a first electric machine selectively coupled to the engine by a first clutch, a second electric machine coupled to the engine, a step-ratio transmission selectively coupled to the electric machine by a second clutch include starting the engine using either the first electric machine or the second electric machine based on engine stop position. The first electric machine may be a low voltage starter motor or integrated starter-generator. The system and method may use the first electric machine when the engine stop position is within a specified range of positions relative to a piston top dead center position associated with higher cranking torques.

15 Claims, 4 Drawing Sheets

(56) References Cited

U.S. PATENT DOCUMENTS

| | | |
|---|---|---|
| 8,894,540 B2 | 11/2014 | Hashemi et al. |
| 9,086,045 B2 | 7/2015 | Wang et al. |
| 9,096,135 B1 * | 8/2015 | Simonini ............ B60L 11/1803 |
| 9,322,378 B2 * | 4/2016 | Lovett .................... F02N 11/04 |
| 2013/0231817 A1 * | 9/2013 | Werner ................... B60K 6/48 |
| | | 701/22 |
| 2014/0067183 A1 | 3/2014 | Sisk |
| 2015/0112523 A1 | 4/2015 | Wang et al. |

* cited by examiner

SYSTEM AND METHOD FOR ENGINE STARTING IN A HYBRID VEHICLE BASED ON ENGINE STOP POSITION

TECHNICAL FIELD

This application relates to systems and methods for starting an engine in a hybrid vehicle based on position of engine pistons when the engine stopped.

BACKGROUND

Hybrid vehicles include an engine and an electric machine that operates as a motor/generator with an associated battery to provide an electric vehicle (EV) mode using only electric power to propel the vehicle, or a hybrid electric vehicle (HEV) mode that uses the engine and motor to propel the vehicle. Hybrid vehicles may start the engine using a dedicated starter motor and/or various types and sizes of electric machines that may function as a motor/generator or an integrated starter-generator (ISG). The engine may be started frequently under various operating conditions to meet driver demanded torque or to transition between EV and HEV operating modes such that the selected starting strategy may significantly impact overall vehicle efficiency, performance, and drivability.

The electric machine of a hybrid vehicle may be coupled to the engine to start the engine under various operating conditions. The torque available to start the engine using the disconnect clutch to couple the electric motor is limited based on the size and capabilities of the electric motor. This motor has a limit to the amount of torque it can provide for engine starts, as it also needs to provide propulsive torque. As such, engine starting torque may be reserved by the electric motor to provide sufficient torque capacity during operation to crank the engine and overcome engine friction and inertia, which may vary based on operating conditions such as temperature, and engine stop position, for example, which limits the available motor torque to propel the vehicle. Some engine stopping positions, i.e. positions of pistons with the engine cylinders and associated state of intake/exhaust valves may require engine cranking torque that exceeds the available motor torque, which may result in engine starting issues.

SUMMARY

In one or more embodiments, a vehicle includes an engine, a first electric machine selectively coupled to the engine by a first clutch, a second electric machine coupled to the engine, a step-ratio transmission selectively coupled to the electric machine by a second clutch, and a processor programmed to start the engine using either the first electric machine or the second electric machine depending upon engine stop position. The processor may be further programmed to start the engine using the first electric machine in response to an engine stop position having associated cranking torque that is less than an associated threshold, and to start the engine using the second electric machine in response to the engine stop position having associated cranking torque that is not less than the associated threshold. The second electric machine may be a low voltage starter motor or an integrated starter-generator, which may be coupled to the engine by a belt, for example. The processor may be further programmed to start the engine using the second electric machine when an engine crankshaft position is within a range of 10-35 degrees after top dead center of at least one engine piston.

Embodiments may also include a hybrid vehicle having an engine with a starter motor and coupled by a first clutch to an electric machine, which is coupled by a second clutch to a step-ratio transmission, and a processor programmed to start the engine using the starter motor in response to an engine start request if engine stopping position has an associated cranking torque that exceeds a threshold, and to start the engine using the electric machine otherwise. The processor may be further programmed to control the first clutch to start the engine in response to the engine start request and the engine stopping position having an associated cranking torque that does not exceed the threshold. The processor may also be programmed to start the engine using the starter motor in response to engine crankshaft rotational position upon engine stopping being within a predetermined range of engine crankshaft rotational positions.

Engine starting methods for a hybrid vehicle may include embodiments that start an engine using a first electric machine in response to engine stopping position being within a specified range, and start the engine using a second electric machine coupled to the engine through a disconnect clutch otherwise. The specified range may correspond to a crankshaft position associated with piston position within at least one cylinder relative to top dead center such as between about 10 and about 35 degrees after top dead center, for example. The first electric machine may include a low voltage starter motor or an integrated starter-generator.

Various embodiments may provide one or more advantages. For example, engine starting in a hybrid vehicle according to various embodiments provides selection of a starting device and strategy based on engine stop position to improve engine start robustness. Selection of a starting device based on engine stop position may improve drivability when the traction motor may not be able to provide sufficient cranking torque due to propulsive demands. Use of a low voltage starter to start the engine rather than coupling the engine to the traction motor may also improve fuel economy under various operating conditions.

The above advantages and other advantages and features of various embodiments of the claimed subject matter may be recognized by those of ordinary skill in the art based on the representative embodiments described and illustrated.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As recognized by the inventors of this application, engine cranking torque depends on the position of the pistons within the cylinders and the state of the intake/exhaust valves when the engine stops such that various piston positions require more engine cranking torque than others. As such, it may be advantageous to select an engine starting strategy and associated device depending on engine stopping position. Accordingly, various embodiments select an engine starting device and/or strategy based on the stopping position of the engine, i.e. the position of one or more pistons within an associated cylinder when the engine is shutdown or stopped as engine stopping position affects the cranking torque for a subsequent engine start.

Figure 1:
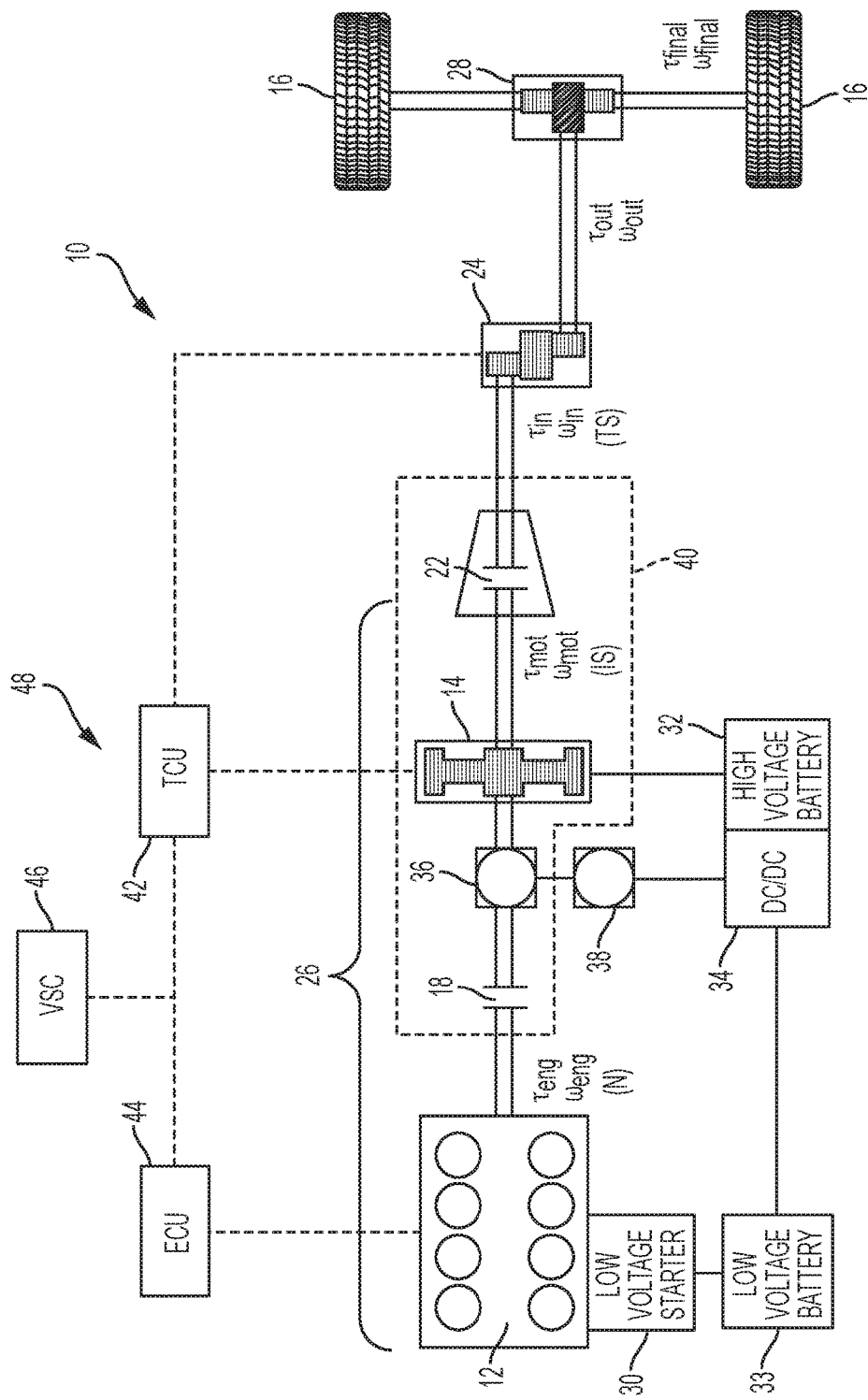
FIG. 1 is a schematic diagram illustrating a representative hybrid vehicle in a system or method for engine starting based on engine stop position according to various embodiments.

FIG. 1 illustrates a schematic diagram of a hybrid vehicle 10 according to various representative embodiments. The vehicle 10 includes an engine 12, and an electric machine implemented by a motor generator (M/G) 14, and alternatively may be referred to as a traction motor. The M/G 14 is configured to transfer torque to the engine 12 or to the vehicle wheels 16, depending on the particular operation mode. The M/G 14 is connected to the engine 12 using a first clutch 18, also known as a disconnect clutch, a first clutch, or an upstream clutch. The clutch 18 may also include a damper mechanism such as a series of plates and springs configured to dampen changes in torque transferred between the engine 12 and the M/G 14 when the disconnect clutch 18 is being engaged. A second clutch 22, also known as a launch clutch or downstream clutch, connects the M/G 14 to a transmission 24. The launch clutch 22 may be controlled to decouple or isolate the driveline 26, which includes the M/G 14 and the engine 12, from the transmission 24, differential 28, and the vehicle drive wheels 16. Although the clutches 18, 22 are described and illustrated as hydraulic clutches, other types of clutches, such as electromechanical clutches may also be used. Alternatively, clutch 22 may be replaced with a torque converter having a bypass clutch as described in greater detail herein. In various embodiments, the downstream clutch 22 refers to various coupling devices for the vehicle 10 including a traditional clutch, and a torque converter having a bypass (lock-out) clutch.

The engine 12 output shaft is connected to the disconnect clutch 18, which in turn is connected to the input shaft for M/G 14. The output shaft of M/G 14 is connected to the launch clutch 22, which in turn is connected to the transmission 24. The components of driveline 26 of the vehicle 10 are positioned sequentially in series with one another.

In another embodiment of the vehicle, the downstream clutch 22 is a torque converter with a bypass clutch. The input from M/G 14 is the impeller side of the torque converter, and the output from the torque converter to the transmission 24 is the turbine side. The torque converter 22 transfers torque using its fluid coupling, and torque multiplication may occur depending on the amount of slip between the impeller and turbine. The bypass or lock-up clutch for the torque converter may be selectively engaged to create a mechanical connection between the impeller and turbine for direct torque transfer. The bypass clutch may be slipped and/or opened to control the amount of torque transferred through the downstream clutch device 22. The torque converter may also include a one way clutch.

Engine 12 may be cranked and started using M/G 14 to rotate the engine 12 using torque provided through clutch 18, or using an alternative starting device, such as another electrical machine that may be implemented by a low voltage starter motor 30 or similar device operatively connected to the engine 12, for example, as illustrated and described with respect to FIGS. 2A-2D. The starter device or motor 30 may be used to provide torque to start the engine 12 without the addition of torque from the M/G 14. This isolates or decouples M/G 14 during starting of engine 12 and may reduce or eliminate torque disturbances that would otherwise occur when M/G 14 is used to assist or start the engine 12.

As also illustrated in FIG. 1, M/G 14 is in communication with a battery 32. The battery 32 may be a high voltage battery, which may also be referred to as a traction battery or battery pack. M/G 14 may be configured to charge the battery 32 in a regeneration mode, for example when vehicle power output exceeds driver demand, through regenerative braking, or the like. In one example, battery 32 is configured to connect to an external electric grid, such as for a plug-in electric hybrid electric vehicle (PHEV). A low voltage battery 33 may also be provided to supply power to the starter motor or other vehicle components or accessories, and may be connected to battery 32 by a DC/DC converter 34 or similar vehicle power electronics. Alternatively, the vehicle power electronics and associated DC/DC converter may be used to directly power various low voltage devices, components, and accessories. Low voltage devices may be connected to a vehicle power distribution system including a wiring harness to provide various low voltage power, such as 12V, 24V, 48V, etc. depending on the particular application and implementation.

In some embodiments, transmission 24 is an automatic transmission, such as a hydraulically actuated step-ratio automatic transmission or an electromechanically actuated transmission such as an automated mechanical transmission (AMT) connected to the drive wheels 16 in a conventional manner, which may include a differential 28. Vehicle 10 is also provided with a pair of non-driven wheels; however, in alternative embodiments, a transfer case and a second differential may be utilized to positively drive all of the vehicle wheels.

Transmission 24 has a gear box to provide various discrete gear ratios for vehicle 10. The gearbox may include clutches and planetary gearsets, or other arrangements of clutches and gear trains as known in the art. Pressurized fluid for the transmission may be provided by a transmission pump 36 connected to or adjacent to an electric machine or traction motor/generator 14 such that it rotates with the motor/generator 14 and the driveshaft to provide pressurized transmission fluid to the gearbox. An electrically powered auxiliary pump 38 may also be provided. Traction motor/generator 14, clutches 18, 22, and transmission pump 36 may be located within a motor generator case 40, which may be incorporated into the case for transmission 24, or alternatively, is a separate case or housing within the vehicle 10.

Transmission 24 may be controlled using a transmission control unit (TCU) 42 to operate on a shift schedule to select a particular gear or gear ratio based on current vehicle and ambient operating conditions. An engine control unit (ECU) 44 may be configured or programmed to control the operation of engine 12, including selection of an engine starting device and starting strategy as described herein. A vehicle system controller (VSC) 46 transfers data between TCU 42 and ECU 44 and is also in communication with various vehicle sensors and driver inputs. The control system 48 for vehicle 10 may include any number of controllers, and may be integrated into a single controller, or have various modules. Some or all of the controllers may be connected by a controller area network (CAN) or other system. The control system 48 may be configured to control operation of the various components of the transmission 24, the motor generator assembly 14, the starter motor 30, and the engine 12 under any of a number of different conditions, including determining a start sequence for the engine 12 and implementing the start sequence.

When the vehicle 10 is being operated it may experience a series of situations and driving conditions that can be termed use cases, or operating conditions. Use cases categorize various driver commands (e.g., accelerator pedal position, brake pedal position, gear lever, etc.) and vehicle conditions (vehicle speed, clutch states, gear ratios, temperatures, etc.) into groupings that may be recognized by the control system 48. The vehicle 10 may include a number of use cases that result in an engine 12 start request. For example, in one use case the vehicle 10 is stationary with the gear lever in drive and the brake engaged, and the VSC 46 may request an engine start based on the state of charge (SOC) of battery 32 being below a threshold. In another example, the vehicle 10 is in motion in an electric-only (EV) mode at a steady speed (with engine 12 disconnected and off) and the accelerator pedal has a tip-in such that VSC 46 determines that the additional power request requires an engine start.

Some use cases involve starting the engine 12 while the launch clutch 22 (or torque converter with a lock out or bypass clutch) is open, slipping, or engaged. Differing states of the launch clutch 22 require different engine start sequences based upon how various actuators and inputs, such as the M/G 14, engine 12, starter motor 30, and clutches 18, 22, are operated and controlled to achieve the desired engine start. In various embodiments, engine stop position is used alone or in combination with various other driver inputs and information, such as gear lever and driver demanded torque, as well as actuator information such as transmission input and output speed to determine an appropriate engine starting strategy or sequence and control related components.

One or more vehicle or system controllers, such as TCU 42, ECU 44, and VSC 46, may include a microprocessor, processor, or central processing unit (CPU) in communication with various types of non-transitory computer readable storage devices or media. Non-transitory computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling starting of the engine and associated components or systems of the vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, TCU 42, ECU 44, and VSC 46 may communicate signals to and/or from engine 12, electric machine 14, transmission gearbox 24, disconnect clutch 18, launch clutch 22, power electronics and DC/DC converter 34, and electrical machine 30.

Although not explicitly illustrated, those of ordinary skill in the art will recognize various functions or components that may be controlled by one or more of the controllers. Representative examples of parameters, systems, and/or components that may be directly or indirectly actuated using control logic executed by the controllers include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, operation of electric machine 14, operation of electric machine (low voltage starter 30), clutch pressures for disconnect clutch 18, launch clutch 22, and transmission gearbox 24, and the like. Sensors communicating input through the I/O interface may be used to indicate turbocharger boost pressure, crankshaft position, engine rotational speed or rotational position, wheel speeds, vehicle speed, coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch status, deceleration or shift mode, for example.

Control logic or functions performed alone or in combination by one or more controllers may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as TCU 42, ECU 44, and VSC 46. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer or processor to perform a method to control the vehicle or its subsystems. The computer-readable storage devices or media may include one or more of a number of known physical devices which utilize electric, magnetic, and/or optical storage to keep executable instructions and associated calibration information, operating variables, and the like.

To drive the vehicle with the engine 12, the disconnect clutch 18 is at least partially engaged to transfer at least a portion of the engine torque through the disconnect clutch 18 to the electric machine 14, and then from the electric machine 14 through the clutch 22, gearbox 24, and final drive 28. The electric machine 14 may assist the engine 12 by providing additional power to turn the electric machine input/output shaft. This operation mode may be referred to as a "hybrid mode", "hybrid electric vehicle (HEV)" mode, or an "electric assist mode." The engine may be started using an electric machine (implemented by low voltage starter 30 in this embodiment) with disconnect clutch open, or by at least partially engaging disconnect clutch 18 to crank the engine using torque from electric machine 14. An engine start request may be generated based on various operating conditions to provide driver demanded torque to wheels 16. For example, an engine start request may be generated in response to available torque from electric machine 14 being insufficient to deliver the driver demanded torque, which may be associated with the state of charge of battery 32, a selected operating mode (such as HEV), or to power one or more vehicle accessories, for example.

To drive the vehicle using electric machine 14 as the sole power source, the power flow remains the same except the disconnect clutch 18 is opened and isolates or decouples the engine 12 from the remainder of the powertrain. Combustion in the engine 12 may be disabled or otherwise OFF during this time to conserve fuel. The traction battery 32 transmits stored electrical energy to power electric machine 14. This operation mode may be referred to as an "electric only" or "electric vehicle (EV)" operation mode. An engine start request may be generated when operating in EV mode in response to similar operating conditions as described above with respect to operating in HEV mode.

In any mode of operation, electric machine 14 may act as a motor and provide a driving force for the powertrain. Alternatively, electric machine 14 may act as a generator and convert kinetic energy from the powertrain into electric energy to be stored in the battery 20, such as during regenerative braking, for example. Electric machine 14 may act as a generator while the engine 12 is providing propulsion power for the vehicle 10, for example. As illustrated and described in greater detail with respect to FIGS. 2-4, TCU 42, ECU 44, and/or VSC 46 may select one of the electric machines to crank or start engine 12 in response to an engine start request based on an engine stop position. Depending on the selected electric machine, various other components, such as disconnect clutch 18, launch clutch 22, gearbox 24, pump 36, etc. may also be controlled to provide desired drivability and system performance during engine cranking and starting using electric machine 14. Use of electric machine 14 operating as a first electric machine to start engine 12 includes operation of disconnect clutch 18 to at least partially couple electric machine 14 to engine 12. Engine starting torque may be reserved from electric machine 14 by imposing a higher minimum battery state of charge (SOC) of battery 32, or limiting output torque while operating in the EV mode so that electric machine 14 can supply sufficient torque to start engine 12, for example. In at least one embodiment, a second electric machine is implemented by low voltage starter 30 and may be used to crank and start engine 12 in response to an engine start request based on engine stop position. The second electric machine may be used when engine stop position is within a specified or predetermined range associated with higher cranking torque, such as when one or more pistons are between about 10-35 degrees after top dead center of crankshaft rotation, for example.

It should be understood that the schematic illustrated in FIG. 1 is merely representative and is not intended to be limiting. Other configurations are contemplated that utilize selective engagement of both an engine and a motor to transmit torque through the transmission. For example, the M/G 14 may be offset from the crankshaft, an additional motor or ISG may be provided to start the engine 12, and/or the M/G 14 torque may be provided between the torque converter clutch 22 and the gearbox 24. Other configurations are contemplated without deviating from the scope of the present disclosure.

FIGS. 2A-2D illustrate various embodiments of a vehicle system having an electric machine that may be used to crank and start an engine in response to an engine start request based on engine stop position, i.e. the position of the crankshaft and associated piston positions within associated cylinders. As described above, use of an electric machine such as a low voltage starter motor or integrated starter-generator (ISG) may improve fuel economy and drivability to deliver higher cranking torques associated with corresponding engine stop positions.

Figure 2A:
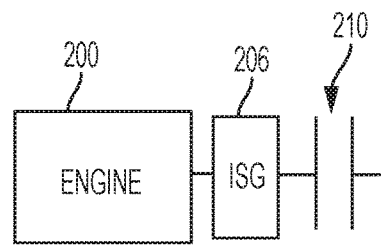
FIGS. 2A-D illustrate various embodiments of a hybrid vehicle having an electric machine for starting an engine selected based on engine stop position.

An embodiment having an electric machine of the vehicle implemented by an ISG is illustrated in FIG. 2A. Engine 200 includes an ISG 206 mounted on the same shaft as the upstream side of the disconnect or first clutch 210, which selectively couples engine 200 and ISG 206 to a second electric machine (such as electric machine 14 of FIG. 1) connected to the downstream side of clutch 210. ISG 206 may be connected to a low voltage battery or power source (such as a 12V, 24V, 36V, or 48V power source, for example) or a high voltage battery through power electronics including a DC/DC converter as previously described. A vehicle controller controls ISG 206 to start engine 200 in response to an engine start request for corresponding vehicle and/or ambient operating conditions based on an engine stop position. Clutch 210 may be controlled so that it is partially engaged (slipping) or disengaged (also referred to as open) to provide a decoupled engine start with the downstream powertrain or driveline components decoupled from the engine 200 and ISG 206. ISG 206 is typically not sized to provide enough torque to start engine 200 with clutch 210 engaged or closed.

Figure 2B:
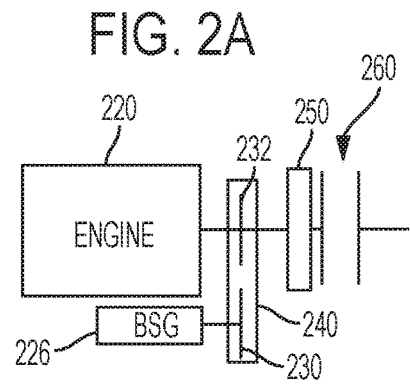
Figure 2C:
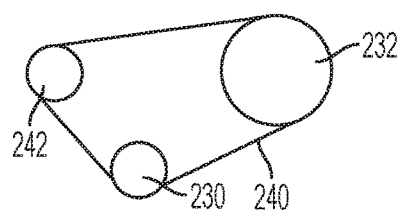

FIGS. 2B and 2C illustrate a representative embodiment of a hybrid vehicle having a belt-driven ISG, which may also be referred to as a BSG or BISG. FIG. 2B is a schematic side view and FIG. 2C illustrates an end view with various components omitted for clarity. Engine 220 may be coupled to BSG 226 using various pulleys and one or more belts. In the illustrated embodiment, BSG 226 is coupled to a starter-generator pulley 230, which is coupled to an engine shaft pulley 232 by a belt 240. This embodiment may also include a starter pulley 242 that applies tension to belt 240 to selectively engage and disengage BSG 226 from rotating with engine shaft pulley 232. An engine flywheel 250 is positioned upstream of the disconnect clutch 260. The embodiment of FIGS. 2B, 2C operates in a similar fashion as described above with respect to FIG. 2A to provide a decoupled engine start with clutch 260 partially disengaged (slipping) or fully disengaged (open) in response to an engine start request with the BSG 226 selected as the starting device based on engine stopping position. BSG 226 may be used to enhance the conventional low voltage (e.g. 12V) generator to have motoring capability. Engine 220 may be permanently coupled to BSG 226 through belt 240, or selectively engaged and disengaged as previously described.

Figure 2D:
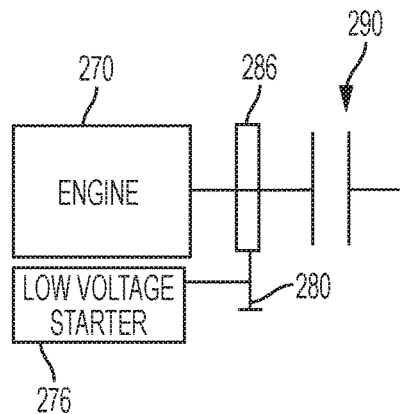

A low voltage starter motor embodiment similar to the embodiment of FIG. 1 is illustrated schematically in FIG. 2D. Engine 270 includes a low voltage (such as 12V, 24V, 48V, etc.) starter 276 coupled by a starter gear 280 to engine flywheel 286. Disconnect clutch 290 may be operated as previously described with respect to the ISG embodiments to provide a decoupled engine start by partially or fully disengaging clutch 290. Low voltage starter 276 is energized in response to an engine start request to crank and start engine 270 in response to an engine start request with low voltage starter 276 selected based on the engine stopping position.

Figure 3:
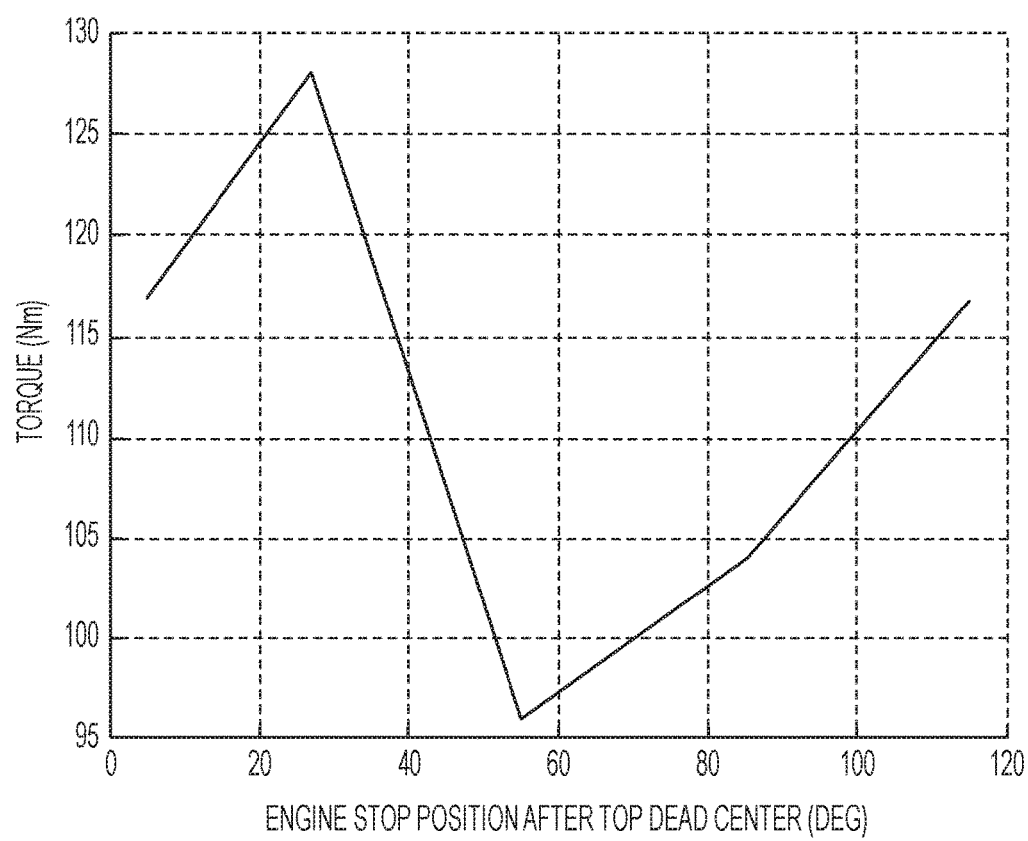
FIG. 3 is a graph illustrating engine cranking torque as a function of engine stop position.

FIG. 3 is a graph illustrating engine cranking torque relative to engine stop position. In the representative embodiment illustrated in FIG. 3, engine cranking torque varies from about 95 Nm to about 128 Nm depending on the engine stop position. In the graph of FIG. 3, engine stop position is plotted in degrees after top dead center (ATDC) with the peak cranking torque occurring at about 25 degrees ATDC. Engine stop position may be determined by a corresponding crankshaft position sensor to determine the relative angle of rotation of the crankshaft. As generally understood by those of ordinary skill in the art, TDC is the position of the piston when it reaches its highest point near the top of the cylinder. As the crankshaft continues to rotate, the piston moves down from TDC toward a bottom dead center (BDC) position. For a four-stroke or four-cycle engine, each piston reaches TDC and BDC twice during each combustion cycle. The values of the cranking torque and pattern or shape of the curve will vary based on the particular engine design including the compression ratio, valve timing, and number of cylinders, among other parameters.

In the embodiment of FIG. 3, the piston position within the cylinder approaches TDC every 120 degrees of crankshaft rotation. Selection of a starting device may be based on the position of a designated or specified piston/cylinder when the engine stopped rotating after a previous engine shutdown. While the graph of FIG. 3 illustrates the engine stop position as degrees ATDC, other reference frames may be used for the engine stopping position, such as crankshaft position relative to a crankshaft reference point or marker, for example. Similarly, the starting device may be selected based on the anticipated required cranking torque taking into consideration various other engine and ambient operating parameters or conditions, such as valve timing and/or engine temperature, for example. In one embodiment, the starter motor or ISG is selected in response to an engine start request when the engine stop position is between about 10-35 degrees ATDC corresponding to engine cranking torques of between about 117-128 Nm in this embodiment.

Figure 4:
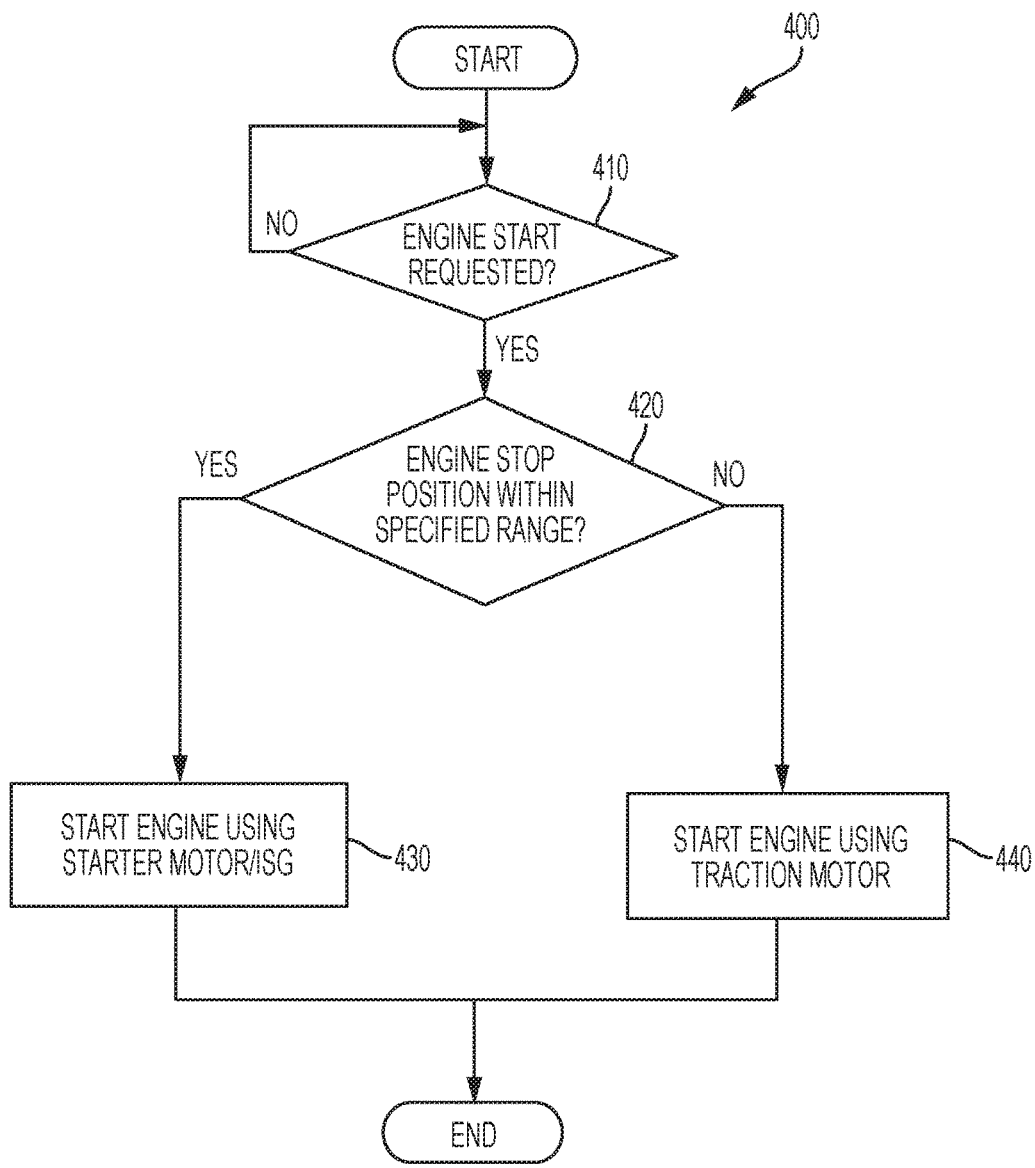
FIG. 4 is a flow chart illustrating operation of a system or method for engine starting based on engine stop position according to various embodiments.

FIG. 4 is a simplified flowchart illustrating operation of a system or method for controlling a hybrid vehicle according to representative embodiments. As previously described, those of ordinary skill in the art will recognize that the illustrated functions or features may be performed by a programmed processor or controller to select an engine starting device in response to an engine start request based on engine stop position.

System or method 400 includes determining whether an engine start has been requested as represented at 410. As previously described, an engine start may be requested from one or more controllers to provide engine torque to supplement traction motor/generator torque, charge the traction battery, power vehicle accessories, emissions management, etc. In response to an engine start request indicated at 410, block 420 determines which of the available starting devices will be used to crank/start the engine based on the engine stop position from the previous engine shutdown. In the illustrated embodiment, if the engine stop position is within a predetermined or specified range, then the engine is cranked/started using a first electric machine, which may be a starter motor, ISG, BISG, or similar device as represented at 430. Otherwise, the engine is started/cranked using the traction motor/generator by coupling the traction motor/generator to the engine by partially or fully engaging the disconnect clutch as represented at 440. The decision represented by block 420 may alternatively be based on an anticipated engine cranking torque based on engine stop position and one or more additional engine or ambient operating conditions, such as engine intake/exhaust valve position, engine oil temperature, and the like. Similarly, block 420 represents determining or selecting a starting device or strategy based on engine stop position according to an associated cranking torque exceeding a corresponding threshold. For example, in one embodiment, block 420 determines whether engine stop position is in a range of between about 10-35 degrees ATDC. Alternatively or equivalently, block 420 may determine whether anticipated cranking torque is about a corresponding threshold, such as 118 Nm, for example. As previously described, engine stop position and associated anticipated engine cranking torque may be referenced to various other thresholds or ranges depending on the particular application and implementation.

Those of ordinary skill in the art will recognize that various embodiments illustrated and described herein provide robust and consistent engine starting with advantages associated with coupled and decoupled starting strategies. For example, scheduling or selection of a decoupled engine start at the first engine start of a driving cycle when the engine is cooled down and engine stop position is unknown, or at low vehicle speed and high driver demand provides consistent and reliable engine starting while minimizing impact on drivability and torque delivery to the wheels. Selection or scheduling of a decoupled engine starting strategy based on operating conditions facilitates dynamic release of motor torque otherwise reserved for engine cranking for use in propelling the vehicle.

While one or more embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that may not be explicitly described or illustrated. Various embodiments may have been described as providing advantages or being preferred over other embodiments or prior art implementations with respect to one or more desired characteristics. However, as one of ordinary skill in the art is aware, one or more features or characteristics may be compromised to achieve desired overall system attributes, which depend on the specific application and implementation. These attributes may include, but are not limited to: cost, strength, security, durability, life cycle cost, marketability, appearance, packaging, size, serviceability, weight, manufacturability, ease of assembly, etc. Embodiments described as less desirable than other embodiments or prior art implementations with respect to one or more characteristics are not outside the scope of the disclosure or claims and may be desirable for particular applications.

What is claimed is:

1. A vehicle comprising:
    an engine;
    a first electric machine selectively coupled to the engine by a first clutch;
    a second electric machine coupled to the engine;
    a step-ratio transmission having an input selectively coupled to the first electric machine by a second clutch; and
    a processor programmed to start the engine using the first electric machine responsive to an engine stop position having associated cranking torque less than an associated threshold.

2. The vehicle of claim 1, the processor further programmed to start the engine using the second electric machine in response to the engine stop position having associated cranking torque that is not less than the associated threshold.

3. The vehicle of claim 2 wherein the second electric machine comprises an integrated starter-generator.

4. The vehicle of claim 2 wherein the second electric machine is coupled to the engine by a belt.

5. The vehicle of claim 1 wherein the second electric machine comprises a low voltage starter motor.

6. The vehicle of claim 1, the processor further programmed to start the engine using the second electric machine when an engine crankshaft position is within a range of 10-35 degrees after top dead center of at least one engine piston.

7. The vehicle of claim 6 wherein the second electric machine comprises a low voltage starter motor.

8. A hybrid vehicle having an engine with a starter motor and coupled by a first clutch to an electric machine, which is coupled by a second clutch to a step-ratio transmission, comprising:
    a processor programmed to: if engine stopping position has an associated cranking torque that exceeds a threshold, then start the engine using the starter motor, else start the engine using the electric machine.

9. The vehicle of claim 8, the processor further programmed to control the first clutch to start the engine in response to the engine start request and the engine stopping position having an associated cranking torque that does not exceed the threshold.

10. The vehicle of claim 8, the starter motor comprising an integrated starter-generator.

11. The vehicle of claim 8, the processor further programmed to start the engine using the starter motor in response to engine crankshaft rotational position upon engine stopping being within a predetermined range of engine crankshaft rotational positions.

12. The vehicle of claim 11 wherein the predetermined range of engine crankshaft rotational positions corresponds to between 10 and 35 degrees after an engine piston reaches top dead center within a corresponding engine cylinder.

13. A method for controlling a hybrid vehicle, comprising:
    starting an engine using a first electric machine in response to engine stopping position being within a specified range of between 10 and 35 degrees after top dead center; and
    starting the engine using a second electric machine coupled to the engine through a disconnect clutch responsive to the engine stopping position not being within the specified range.

14. The method of claim 13 wherein the first electric machine comprises a low voltage starter motor.

15. The method of claim 13 wherein the first electric machine comprises an integrated starter-generator.

* * * * *